June 8, 1965    R. H. KOLB    3,188,565
DRUM SHAPED FLUID STREAM ANALYSIS DETECTOR HAVING
VORTICAL FLOW OF THE FLUID THEREIN
Filed March 29, 1962
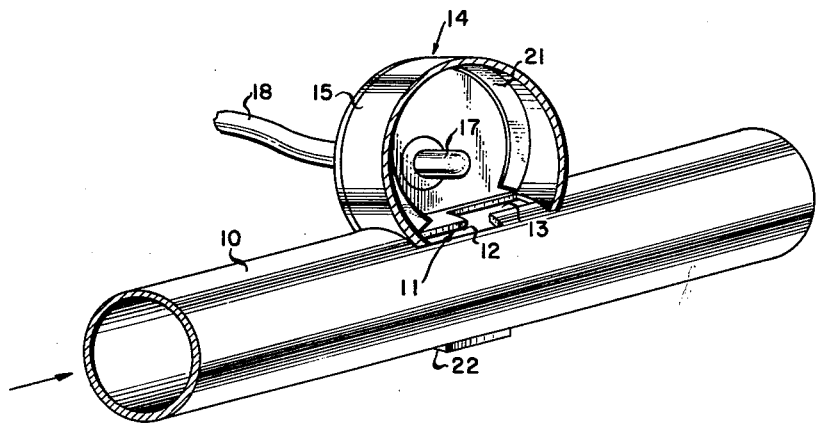
FIG. 1
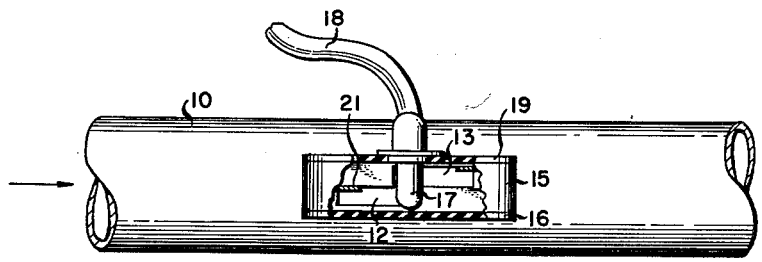
FIG. 2
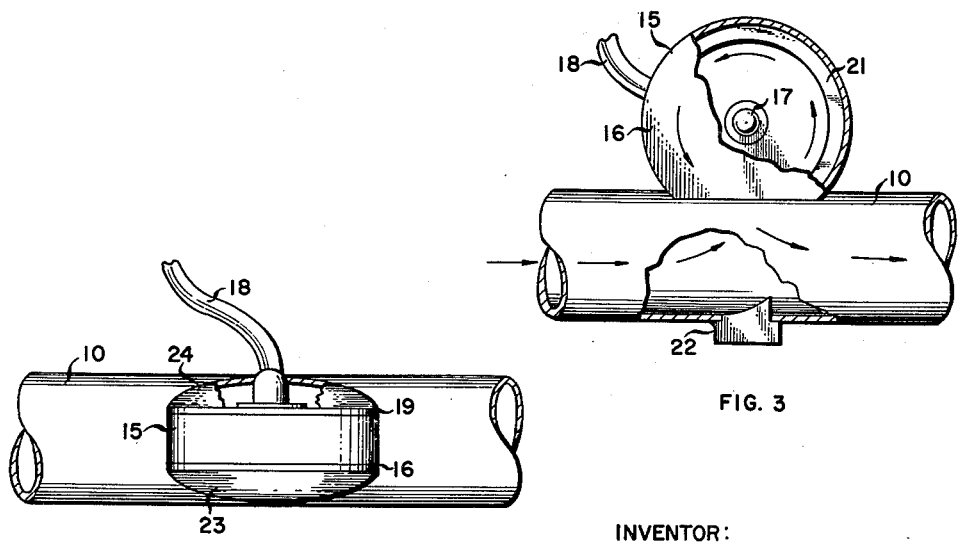
FIG. 3
FIG. 4
INVENTOR:
ROBERT H. KOLB
BY: *John K. Williams*
HIS ATTORNEY

United States Patent Office 3,188,565
Patented June 8, 1965

3,188,565
DRUM SHAPED FLUID STREAM ANALYSIS DETECTOR HAVING VORTICAL FLOW OF THE FLUID THEREIN
Robert H. Kolb, Houston, Tex., assignor to Shell Oil Company, New York, N.Y., a corporation of Delaware
Filed Mar. 29, 1962, Ser. No. 183,645
10 Claims. (Cl. 324—61)

The present invention relates to an apparatus to continually detect the properties of a stream flowing through a conduit. More particularly, the invention is directed to a sensing probe and housing therefore adapted to be in communication with fluid flowing through a conduit.

The invention has particular application in logging drilling fluid streams returning from gas drilling operations. Information pertaining to such streams is important since it aids in solving and avoiding problems that reduce the economic advantages of gas drilling. Such information includes the immediate detection of where and at what rate fluid is entering the hole, the occurrence of fires in the hole, the presence of hydrocarbons in the formation being drilled, etc.

At present, systems are not available to detect reliably the qualitative and quantitive variations in physical and/or chemical properties of gaseous fluids returning from gas drilling operations. In current practices, it is common to simply observe the return (during daylight hours) for obvious changes in water and cutting content.

In order to devise an improved system for detecting the properties of fluid streams, I have investigated the value of logging the fluid in return conduits from gas drilling operations with devices utilizing probes inserted into the conduits. Although somewhat effective, these devices illustrated that the probes used therein were prone to be abraded away by small particles and broken by larger particles suspended in the fluid flowing through the conduit and to produce erratic results in streams having particles unevenly distributed therein. The investigation of such devices, however, proved that probes could be inserted into streams to determine characteristics of fluid therein. For example, it was demonstrated that the capacitance of a probe comprising a coaxial cylindrical capacitor is capable of providing valuable information on the water content of gas returns from gas drilling operations. The investigation of such devices also demonstrated the critical importance of a probing device capable of producing reliable results in streams having non-uniform and abrasive characteristics.

The principal object of the present invention is, therefore, to provide an apparatus to utilize a sensing probe in a fluid stream, wherein damage to the probe by particles suspended in the stream is maintained at a minimum.

A further object of the invention is to provide a detecting apparatus to effectively determine the properties of a stream having foreign particles unevenly distributed therein.

Another object of the invention is to provide an apparatus to accurately and reliably determine the physical and/or chemical properties of a stream flowing through a conduit.

Yet another object of the invention is to provide a simple and relatively inexpensive apparatus to detect the properties of a fluid flowing through a conduit.

These and other objects of the invention will become apparent when viewed in the light of the following description and accompanying illustrations.

In its broadest aspect, the present invention is directed to an apparatus for sensing the properties of a stream of fluid flowing through a conduit. The apparatus includes a drum having a peripherally disposed opening extending therethrough into communication with the fluid flowing through the conduit to induce vortical flow of the fluid within the drum, and a sensing probe disposed in the drum along the axis thereof.

The invention will now be described in greater detail with reference to the drawings in which:

FIGURE 1 is a perspective view of the inventive apparatus with one end of the drum portion thereof removed.

FIGURE 2 is a plan view of the apparatus, with portions thereof broken away to better illustrate interior details.

FIGURE 3 is an elevational view of the apparatus, as shown in FIGURE 2, with portions thereof broken away to illustrate interior details within the sensing apparatus per se and the conduit disposed therebelow.

FIGURE 4 is a plan view of a modified form of the apparatus, with portions thereof broken away to better illustrate interior details.

In the drawings, corresponding numerals on the several figures designate like parts. The numeral 10 designates a conduit to which the apparatus of the present invention is applied. A port 11 having an upstream portion 12 and a downstream portion 13 is cut in the upper surface of the conduit 10. It is to be understood, that although the illustrated port 11 is a preferable shape, the invention is not limited to this particular port configuration.

The apparatus to which the present invention is primarily directed comprises a drum or housing 14 secured to the upper side of the conduit 10 adjacent the port 11 therein. The upper position of the drum relative to the conduit assures that fluids and solid particles flowing through the conduit will not collect and settle in the drum. The drum is defined by a peripheral wall 15 and end walls 16 and 19. The peripheral wall 15 has an opening at the lower end thereof in communication with the port 11. The wall 15 is fabricated of an electrically conductive material, such as metal, and is grounded by its connection to the conduit 10. End walls 16 and 19 are fabricated of an electrical insulating material and sealingly engage the peripheral wall 15 and the conduit 10 to form a pressure-tight chamber.

A probe 17 extends into the drum along the axis thereof, and is secured to the wall 19. The probe is sealingly received in the wall 19 and has a cable 18 extending therefrom into engagement with a recording apparatus (now shown). The type of recording apparatus secured to the line 18 is dependent on the type of probe used, and the information desired therefrom.

The port 11, as described above, includes a downstream or inlet portion 13 and an upstream or outlet portion 12. Fluid flowing through the conduit 10 enters the drum 14 through the inlet portion 13 and travels around the inner periphery of the drum to the outlet portion 12. A helical guide member 21 is secured to and extends around the inner periphery of the drum 14 and provides a guide means to direct fluid from the inlet portion 13 to the outlet portion 12. Through this structure, interference between fluid entering the drum and fluid leaving the drum is maintained at a minimum.

The arrows in FIGURE 3 illustrate the flow of fluid through the conduit and drum structure of the apparatus. A deflector 22 is positioned in the lower part of conduit 10, as shown in FIGURES 1 and 3. This deflector aids in directing the fluid flowing within the conduit along the path shown by the arrows in FIGURE 3. Preferably, the deflector 22 is positioned below the inlet position 13 of the port 11. It is to be understood that parts of the structure such as the deflector 22, the guide 21, the peripheral walls 15 and the edges of the opening 11 are fabricated of wear-resistant material to resist abrasion from fluid abutting thereagainst.

FIGURE 4 illustrates a modified embodiment of the apparatus illustrated in FIGURES 1 to 3. Like numerals in the respective figures designate corresponding parts. The embodiment of FIGURE 4 has application when the end walls 16 and 19 are fabricated of electrical insulating material and the apparatus is used to detect the dielectric constant of fluid flowing within the drum 14. In this use, the apparatus acts as a coaxial capacitor with the probe 17 and the peripheral wall 15 comprising the central and outer electrodes, respectively. In order to detect the dielectric constant of the fluid flowing in the drum, the electrodes are coupled to a suitable indicating device, as described subsequently.

The embodiment of FIGURE 4 differs from that of the previous figures only in that it includes dish shaped plates 23 and 24 disposed over the end walls 16 and 19 of the drum 14. The plates 23 and 24 are fabricated of electrically conductive material and are grounded by contact with the conduit 10. The spaces between the end walls 16 and 19 and the plates 23 and 24 adjacent thereto are occupied by a substance of fixed dielectric constant.

The FIGURE 4 embodiment is designed to minimize the amount of stray capacitance to ground from the ends of the electrode probe 17 and to minimize changes in this stray capacitance when the end walls 16 and 19 are fabricated of electrical insulating material. The amount of stray capacitance is minimized by the relatively large distance between the ends of the probe 17 and the plates 23 and 24. Changes in stray capacitance are minimized by maintaining a constant distance between the ends of the electrode probe 17 and the plates 23 and 24 and by maintaining the dielectric constant of the substance in the spaces between the walls and the plates adjacent thereto constant. Through this arrangement, the stray capacitance of the apparatus is both minimized and held constant and, therefore, changes in the capacitance indications received from the apparatus accurately reflect the capacitance of the fluid flowing within the drum 14.

The operation of the apparatus will now be described with respect to an application wherein the apparatus acts as a coaxial capacitor to determine the dielectric constant of fluid within the drum 14. Although FIGURE 4 illustrates one embodiment of the invention adapted for use as a coaxial capacitor, it is to be understood that the embodiment of FIGURES 1 to 3 may also serve this use. In this application, the probe 17 and the peripheral wall 15 are the central and outer electrodes, respectively, of the capacitor. The fluid within the drum comprises the dielectric of the capacitor formed by the two electrodes. With this arrangement, various techniques may be used to measure the dielectric constant of the fluid between the electrodes. For example, the electrodes may be coupled to a measuring device as disclosed in U.S. Patent No. 2,939,077 to Branin, Jr. The indication of dielectric constant is of particular value in the monitoring of return streams from gas drilling operations, since the dielectric constant serves as an accurate indication of the amount of water in the return.

In operation, fluid flowing through the conduit 10 enters the drum 14 through the inlet portion 13 of the opening 11. Upon entering the drum 14, the fluid impinges against the peripheral wall 15 thereof and creates a vortex of fluid therein. The fluid leaves the housing through the portion 12 of the opening 11, as illustrated in FIGURE 3. The deflector 22 positioned below the apparatus acts to induce or improve the vortex within the housing.

The vortex within the drum 14 creates relatively high velocities in the fluid flowing along the peripheral wall 15 and leaves essentially zero velocity at the axis of the drum. Therefore, the axial position of the probe 17 places it in a position of essentially zero velocity and definitely out of the path of solid particles which may be present in the fluid flowing within the drum 14. Furthermore, the high velocity at the periphery of the vortex creates centrifugal force in the fluid therein and causes any particles suspended therein to be carried to the outer wall 15. Through this centrifugal force, foreign particles such as droplets of water will be distributed mainly along the outer periphery of the housing 14. This will tend to standardize the distribution of such particles within the housing, thereby reducing the distribution sensitivity of the probe 17. Such sensitivity presents a problem in probes extending into fluid conduits, since foreign matter suspended in the fluid flowing through the conduits is seldom uniform. It is to be understood that the operation of the apparatus thus far described (e.g., flow characteristics) occur independent of the particular type of sensing probe used therein.

In the capacitor sensing application of the apparatus, the cylindrical shape of the housing 14 is of particular advantage since it minimizes distribution sensitivity of the probe. The minimization results since all parts of the outer electrode (e.g., the peripheral wall 15) except at the point of entry are symmetrically positioned with respect to the center probe or electrode 17. The use of electrical insulating material in the end walls of the drum aids in minimizing stray or dead capacitance and insures the large percentage of the total probe capacitance is affected by the dielectric constant of the fluid stream. A plate arrangement disposed exteriorly of the end walls, as illustrated in FIGURE 4, further minimizes the effect of stray capacitance.

The foregoing description of the invention is merely intended to be explanatory thereof. It is to be understood that the apparatus of the present invention is not limited to use with a capacitance probe or to use in return conduits or "blooie" lines from gas drilling operations. For example, temperature probes may be used and the apparatus may have application in water-cut instrumentation on oil producing leases. Therefore, changes in the details of the illustrated construction may be made within the scope of the appended claims without departing from the spirit of the invention.

I claim as my invention:

1. An apparatus for sensing properties of a stream of fluid flowing through a conduit, comprising; a drum, port means extending through a wall of said drum and in communication with the fluid flowing through the conduit; means for inducing vortical flow of said fluid within said drum, and a sensing probe disposed in said drum along the axis thereof.

2. An apparatus for sensing properties of a stream of fluid flowing through a conduit, comprising; a drum disposed laterally of the conduit, means for introducing a portion of said flowing fluid into said drum in a manner to induce a vortical flow of fluid about the axis of said drum, and a sensing probe disposed in said drum along the axis thereof.

3. An apparatus according to claim 2 wherein the axis of the drum is at substantially a right angle with respect to the axis of the conduit, and wherein said means for introducing a portion of said flowing fluid into said drum in a manner to induce a vortical flow of fluid about the axis of said drum includes an opening extending through a peripheral wall of said drum and in communication with a port in said conduit, with the portion of said wall of said drum containing said opening being juxtaposed the surface of the conduit containing said port.

4. An apparatus according to claim 3 wherein the port is in an upwardly facing surface of the conduit.

5. An apparatus according to claim 2 wherein said means for introducing a portion of said flowing fluid into said drum in a manner to induce a vortical flow of fluid about the axis of said drum comprises: an opening extending through a wall of said drum and in communication with a port in said conduit, and a deflector disposed within said conduit to deflect fluid flowing therethrough towards said port.

6. An apparatus according to claim 3 wherein said port has an inlet portion and an outlet portion; and including a guide means disposed within said drum for directing fluid entering said port from the inlet portion to the outlet portion.

7. An apparatus for sensing the dielectric constant of a stream of fluid through a conduit, comprising; a drum including end walls and a peripheral wall, said peripheral wall being electrically conductive and grounded, means for vortically introducing a portion of the fluid flowing in said conduit into said drum; and an electrode disposed within said drum along the axis thereof, said electrode being electrically insulated from the peripheral wall.

8. An apparatus according to claim 7 wherein the end walls of the drum are fabricated of electrical insulating material.

9. An apparatus according to claim 8 wherein said electrode and said peripheral wall of said drum form the plates of a coaxial capacitor, and including means for minimizing the stray capacitance to ground from said coaxial capacitor, said means comprising: electrically conductive grounded plates disposed exteriorly of the drum adjacent the end walls thereof.

10. Apparatus according to claim 7 wherein the axis of the drum is at substantially a right angle with respect to the axis of the conduit; wherein said means for vortically introducing a portion of the fluid flowing in said conduit into said drum includes an opening extending through a peripheral wall of said drum and in communication with a port in said conduit.

References Cited by the Examiner

UNITED STATES PATENTS

| | | | |
|---|---|---|---|
| 1,504,707 | 8/24 | Peters | 324—71 X |
| 2,098,574 | 11/37 | Doyle | 324—71 X |
| 2,608,098 | 8/52 | Paulsen | 73—422 |

WALTER L. CARLSON, *Primary Examiner*.